(No Model.)
T. BERRIDGE.
NUT AND BOLT LOCK.
No. 528,320.   Patented Oct. 30, 1894.
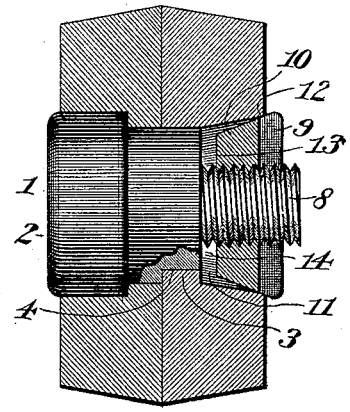
Fig. I.
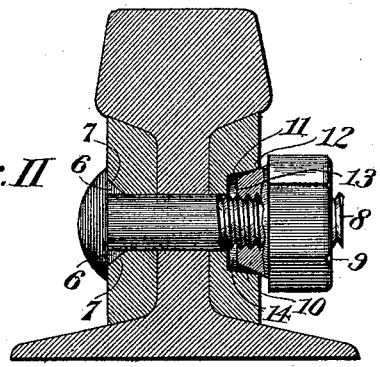
Fig. II.
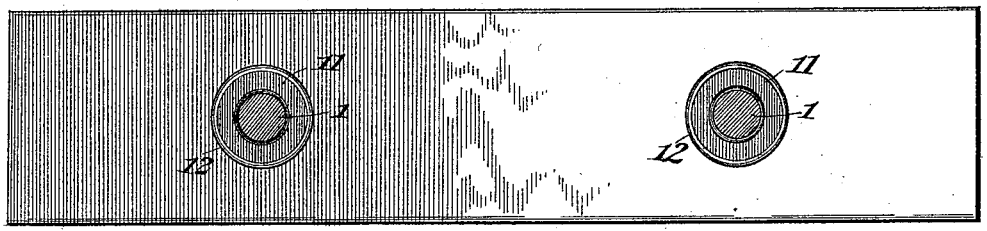
Fig. III.
Witnesses:
Inventor,
Thomas Berridge.
By Joseph L. Atkins
Attorney

UNITED STATES PATENT OFFICE.

THOMAS BERRIDGE, OF STURGIS, MICHIGAN.

NUT AND BOLT LOCK.

SPECIFICATION forming part of Letters Patent No. 528,320, dated October 30, 1894.

Application filed April 20, 1894. Serial No. 508,293. (No model.)

*To all whom it may concern:*

Be it known that I, THOMAS BERRIDGE, of Sturgis, county of St. Joseph, State of Michigan, have invented certain new and useful Improvements in Nut-Fastening Devices, of which the following is a specification, reference being had to the accompanying drawings.

The object of my invention is to produce means for absolutely preventing the movement of a nut upon the thread of a bolt, such as might without my device, be occasioned by the end thrust to which bolts in use are subjected. In using an ordinary nut, it is found in practice that there is a constant tendency of the nut to turn upon the bolt and become loose. This is occasioned by the end thrust of the bolt; that is to say, by a constant pressure exerted upon the base of the nut and tending to separate the nut from the bolt. The tendency of the nut to become loose is counter-acted by the degree of frictional resistance between the threads of the nut and the threads of the bolt, depending in great measure upon the pitch of the threads. If a nut and bolt of extreme pitch were employed the tendency would be sufficient at once to overcome this resistance and the nut would slip freely upon the threads of the bolt. Although it is true that upon the measure of pitch depends the readiness with which the nut yields to the tendency to displace it; yet in bolts and nuts of any pitch whatsoever, it is found that the tendency to turn and become loose is sufficient to overcome in time the resistance to such motion opposed by the bolt and nut. A variety of devices has been employed for the purpose of overcoming this difficulty, which is a serious one wherever bolts and nuts are employed.

Among other devices which have been used to hold the nuts in place, there is a class in which the nut is fastened securely to the bolt and at the same time to the part through which the bolt passes. Consequently, if the nut is fastened with sufficient rigidity to accomplish the purpose sought after, the compression of the nut upon the part through which the bolt passes is so great that no allowance can be made for the expansion and contraction of the bolt. Consequently, it is found that, if the nut does not turn, the bolt will be broken, as is well understood by those familiar with railroad construction, in which the securing of bolts and nuts in rail laying presents many serious difficulties of such character.

By my invention I provide means for securing a nut firmly in place, but without undue compression of the parts through which the bolt passes. I thereby make all necessary allowance for the expansion and contraction of the bolt, and provide for the perfect fastening of the nut without reference to the force which it may exert against the part through which the bolt passes.

In the accompanying drawings:—Figure I is a sectional view through the pivot bolt of a pair of shears, showing my nut fastening device in use. Fig. II is a similar view of a railroad rail, fish plates and bolt with my fastening device in position. Fig. III is an inside view of a magnified fish plate with my nut in position and showing the bolt projecting through the fish plate, but severed to show the relation of the parts.

In the above drawings I have illustrated, for the purpose of explanation, two of the uses to which my invention may be applied, but they are only shown for the purpose of explication.

Referring to the figures on the drawings: 1 indicates a bolt having a head 2, of any suitable and ordinary construction. This bolt is designed to be irrevolubly secured in the position in which it is employed. It is secured for example, as shown in Fig. I, by a longitudinal rib 3 in one half of the shears which fits into a recess 4 in that portion of the bolt nearer its screw threaded end. In Fig. II, however, the bolt is shown as secured to the fish plate 5, as by lugs 6 setting in recesses 7 in the fish plate. It is clear, therefore, that the manner of securing the irrevolubility of the bolt is unimportant and may vary in many ways to suit the purpose to which the bolt is applied.

8 indicates the screw threaded end of the bolt prepared in any usual manner to enter an internally screw threaded nut 9. This nut may be in most respects of any suitable construction and provided with any of the well known means for driving it. It may be, adapted, for example, to be driven by a wrench, by an ordinary screw driver, or by a divided screw driver which straddles the end of the bolt that protrudes through the nut. These methods of driving are merely suggested and are of ordinary, every-day use in driving nuts. All the different means for driving the nut, therefore, are, not illustrated in the drawings. The feature which distinguishes this nut from the ordinary nut is a tapered zone 10 which may begin at one side thereof and enlarge toward the opposite side thereof. It may, in fact, extend the entire width of the nut, or partially across it, as may be preferred. The perforated part against which the nut, in practice, bears, be it a part of a pair of shears, as shown in Fig. I, or a fish plate, as shown in Fig. II, or any other like part, is provided with a recess 11 whose outer edge 12 is adapted to receive the lower end of the tapered zone of the nut. Two things are essential to my device in this respect. The one is that the part against which the nut bears should, at no time, oppose a positive and absolute resistance to the movement of the nut. The other is that the nut should never reach the extreme limit of its travel. For these reasons there should be no projecting ledge upon the periphery of the nut above the zone that might bear against the recessed plate and that the nut should never reach the bottom of the recess 11 to compress with its base 13 the part in which the recess is formed. For that reason the size of the recess 11 and that of the nut are such that there should always be between the base of the nut and the bottom of the recess a chamber 14, or a space prohibiting contact between the base and the bottom of the recess.

From the immediately preceding description, it may be gathered that the recess 11 must not perfectly conform to or fit the zone of the nut, for that would be to oppose to the movement of the nut that positive and absolute resistance which must be avoided in carrying out my invention.

The principle upon which my invention operates is that the end thrust upon the nut is, in the case of ordinary bolts and nuts, sufficient to overcome the slight resistance to the movement of the nut opposed by the friction between the base of the nut and the part which carries the bolt, while in my device the slightest end thrust tending to displace the nut is counteracted by the wedging of the tapered zone of the nut into the recess which receives it. This force increases proportionately to the degree of strain of the end thrust and the greater the end thrust the stronger is the resistance developed against the movement of the nut. It is, therefore, apparent that if the nut be set into the recess so as to barely touch the sides thereof, it will be held in place by that contact and will be secured against rotation on account of the end thrust, because the slightest degree of end thrust will drive the nut deeper into the recess and tend to more firmly and effectually secure it. The proportionate degree of the angle of inclination of the walls of the recess and of the zone of the nut is immaterial, provided always that the angles do not exactly correspond to form a joint between the two. If the angles of the wall of the recess were right angular, the corner of its outer edge would be so sharp as to be readily worn by the abrasion of the wall of the nut against it. Therefore, while it is entirely practicable to employ a recess having walls of right angular inclination, it is preferable, on account of the wear, to employ an inwardly tapering recess, but always one having walls of a different angle of inclination from the angle of inclination of the zone of the nut.

I am aware that it is not new to employ in connection with a part having a tapered recess a nut having a tapered extremity to fit within such a recess, but such a device is not within the scope of my invention and cannot be employed for the purpose for which my invention is devised.

What I claim is—

1. In a nut fastening device, the combination with a part perforated to receive a bolt, and a recess therein, of a bolt adapted to be irrevolubly secured with respect to that part, and a nut for the bolt having an unyielding tapered zone adapted to enter the recess, the angles of inclination of the walls of the zone and the walls of the recess being different, substantially as set forth.

2. In a nut fastening device, the combination with a part perforated to receive a bolt, and a recess therein, of a nut adapted to be drawn by a bolt into the recess, and an unyielding tapered zone upon the nut, the angles of inclination of the walls of the zone and of the walls of the recess being different, substantially as set forth.

3. In a nut fastening device, the combination with a part perforated to receive a bolt, a bolt and means for rendering the bolt irrevoluble with respect to that part, of a recess in the part, a nut for the bolt, and an unyielding tapered zone upon the nut adapted to enter the recess, the angles of inclination of the walls of the zone and of the walls of the recess being different, substantially as set forth.

In testimony of all which I have hereunto subscribed my name.

THOMAS BERRIDGE.

Witnesses:
JOSEPH L. ATKINS,
FRANK D. BLACKISTONE.